United States Patent [19]

Fujii et al.

[11] Patent Number: 4,643,620
[45] Date of Patent: Feb. 17, 1987

[54] COATED HARD METAL TOOL

[75] Inventors: Hiroshi Fujii, Aichi; Akio Hara, Itami; Mitsunori Kobayashi, Itami; Yoshikatsu Mori, Itami, all of Japan

[73] Assignee: Sumitomo Electric Industries, Ltd., Osaka, Japan

[21] Appl. No.: 610,791

[22] Filed: May 16, 1984

[30] Foreign Application Priority Data

May 27, 1983 [JP] Japan ................. 58-94743

[51] Int. Cl.[4] .......................................... B23B 27/14
[52] U.S. Cl. ................................................. 407/119
[58] Field of Search ............................ 407/118, 119

[56] References Cited

FOREIGN PATENT DOCUMENTS

| 41266 | 12/1981 | European Pat. Off. | ............ 407/119 |
|---|---|---|---|
| 0041266 | 12/1981 | European Pat. Off. | . |
| 89818 | 9/1983 | European Pat. Off. | ............ 407/119 |
| 83177 | 7/1978 | Japan | ............ 407/119 |
| 137803 | 10/1980 | Japan | ............ 407/119 |
| 6152541 | 11/1981 | Japan | ............ 407/119 |
| 29572 | 2/1982 | Japan | ............ 407/119 |
| 32366 | 2/1982 | Japan | ............ 407/119 |
| 39168 | 3/1982 | Japan | ............ 407/119 |
| 98670 | 6/1982 | Japan | ............ 407/119 |
| 305189 | 4/1955 | Switzerland | . |
| 751505 | 7/1980 | U.S.S.R. | ............ 407/119 |

OTHER PUBLICATIONS

Patents Abstracts of Japan, vol. 7, No. 29 (M-191) [1174], 5th Feb. 1983; & JP-A-No. 57 184 616 (Fujikoshi K.K.) 13-11-1982.

*Primary Examiner*—Francis S. Husar
*Assistant Examiner*—Jerry Kearns
*Attorney, Agent, or Firm*—Wenderoth, Lind & Ponack

[57] ABSTRACT

A cutting insert having excellent toughness as well as wear resistance is provided comprising a substrate consisting of a sintered hard metal or alloy such as cemented carbides and a coating film provided thereon consisting of a material having a higher hardness than the substrate, characterized in that the coating film near the cutting edge is continuously made thinner or removed toward both the rake face and flank face.

3 Claims, 16 Drawing Figures

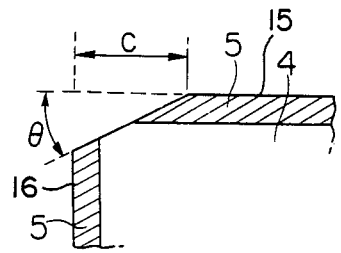
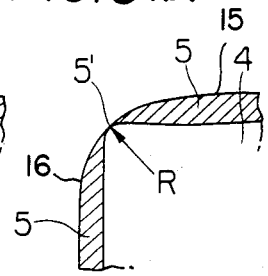
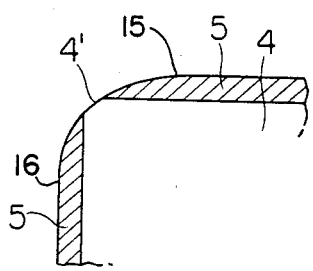
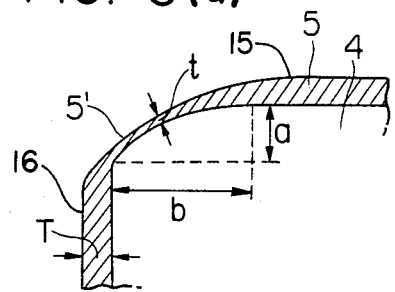
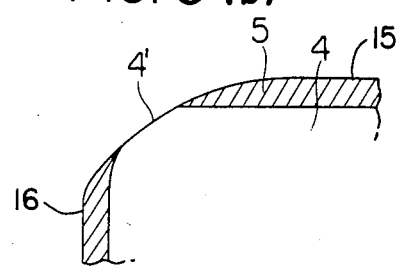
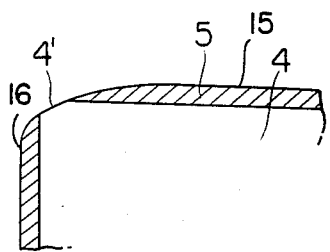
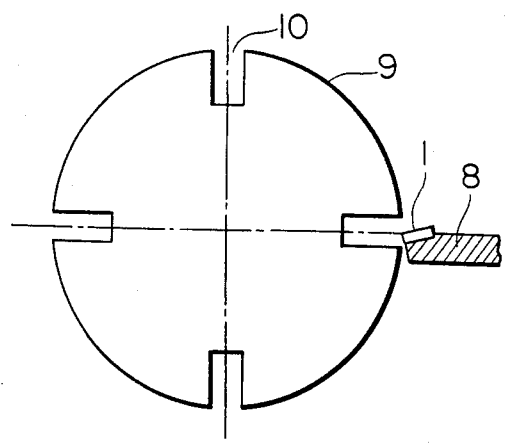

COATED HARD METAL TOOL

BACKGROUND OF THE INVENTION

1. Field of the Invention

This invention relates to coated hard metal tools suitable for use in cutting of metals, for example, turning, milling, threading, drilling, boring, etc., and a process for producing the same. The coated hard metal used herein comprises a substrate of cemented carbide consisting of WC, TiC, TaC, etc. and an iron group metal or a substrate of hard sintered alloy such as cermet consisting predominantly of TiC, TiN, etc., and a coating layer provided thereon consisting of a carbide, nitride, carboxide, carbonitride, oxide or solid solution thereof of Group IVa, Va or IVa element of Periodic Table, Al, Zr or the like, the coating layer having a higher hardness and wear resistance than the substrate.

2. Description of the Prior Art

In the field of cutting of metals, working conditions have become severer with the years and it has been required for cutting tools used to this end to increase the hardness, wear resistance and heat resistance. Cemented carbide tools are capable of satisfying these requirements to some extent, but tools of cemented carbides with various hard coating layers have lately spread. A typical form of the tools is shown in FIG. 1 in which a square insert is fixed to a holder. This is generally called a throwaway insert which is to be thrown away to make an exchange for a new insert after using eight cutting edge corners. In these coated cemented carbide tools, the surface of cemented carbide tip 4 is ordinarily coated by the CVD method, PVD method or the like. FIG. 1(b) is a cross-sectional view of insert 1 along line A—A and FIG. 2 and FIG. 3 are enlarged views of cutting edges 2 near dotted line B. As shown in these figures, the coated cemented carbide inserts of the prior art each have a thicker part near cutting edge 2 than other parts, which differs somewhat depending upon the shape of the cutting edge. When the coating film is of $Al_2O_3$, in particular, that part is usually thicker. In general, if the coating film is thicker, the wear resistance is increased, but the toughness is lowered and chipping tends to occur. That is, the insert having a coating layer near the cutting edge as shown in FIG. 2 and FIG. 3 meets with a drawback that deterioration of the finished surface of a workpiece is caused by the disorder of wearing due to lowering of the toughness, breakage of the cutting edge and micro-chipping. Various proposals have been made so as to overcome this drawback.

For example, Japanese Patent Publication No. 37553/1973 describes a method of making a cemented carbide cutting tool comprising forming a coating layer consisting predominantly of TiC on the whole surface of a cemented carbide insert and removing by grinding the coating layer on the land between the cutting edge and groove for chip breaking to retain the coating layer on only the groove for chip breaking. However, this method has not been put to practical use yet, because it cannot be applied to inserts without chip breaker and inserts with bumpy chip breaker, and it encounters problems that the cutting edge is unfavourably affected by chip occurring by griding and cutting edges 5' and 7' shown in FIG. 4 are brittle due to sharpness by grinding only the rake face. These problems cannot be solved by the similar method described in Japanese Patent Application No. 92732/1971.

By the prior art, therefore, the strength of an edge can be raised to some extent, but the wear resistance can only be held at most similar.

SUMMARY OF THE INVENTION

It is an object of the present invention to provide a coated hard metal tool whereby the disadvantages of the prior art can be overcome.

It is another object of the present invention to provide a coated cemented carbide tool excellent in stability as well as life.

It is a further object of the present invention to provide a coated cemented carbide cutter for turning, milling, threading, drilling and boring machines.

It is a still further object of the present invention to provide a process for producing a coated cemented carbide cutting tool with excellent stability and long life by controlling the thickness of a coating film at the cutting edge part of a coated cemented carbide tool of the prior art.

These objects can be attained by a cutting tool comprising a substrate consisting of a sintered hard metal or alloy such as cemented carbides and a coating film provided thereon consisting of a material with a higher hardness than the substrate, in which the coating film near the cutting edge is made thinner or removed toward both the rake face and flank face side.

BRIEF DESCRIPTION OF THE DRAWINGS

The accompanying drawings are to illustrate the principle and merits of the present invention in more detail.

FIGS. 5(a), (b) and (c) and FIGS. 6(a), (b), (c) are enlarged cross-sectional views near the cutting edge of coated cemented carbide inserts of the present invention.

FIG. 7 shows a cross-sectional view of a workpiece used for test of an insert of the present invention and the position of the insert.

DETAILED DESCRIPTION OF THE INVENTION

The feature of the present invention consists in that the coating film near the cutting edge of a coated hard metal cutting tool of the prior art is made thinner or removed toward rake face side C and flank face side D, whereby to improve not only the edge strength but also the wear resistance.

In the present invention, the hard metal comprises at least one carbide, optionally with at least one nitride, of Group IVa, Va and VIa elements of Periodic Table and a metal binder selected from the iron group metals, and has at least one coating layer having a larger hardness than the hard metal and consisting of at least one of carbides, nitrides, carboxides, carbonitrides and oxides of Group IVa, Va and VIa elements of Periodic Table and Al, and solid solutions thereof.

Figure 3:
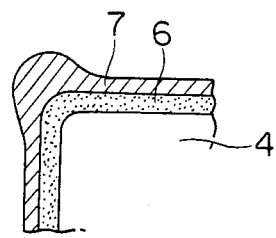
Figure 4A:
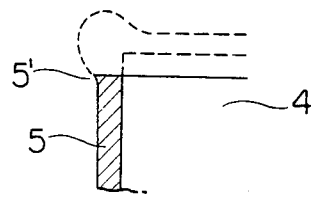
FIGS. 4(a) and (b) are enlarged cross-sectional views near the cutting edges of coated cemented carbide inserts subjected to edge working according to the prior art.
Figure 4B:
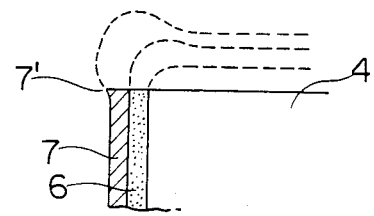

According to the tool of the present invention, not only the toughness is markedly improved, but also the wear resistance is raised unexpectedly from the prior art, while in the prior art method wherein the coating film on only rake face C is removed, the toughness is somewhat improved. The meritorious effect of the present invention is remarkable when the minimum value t of the film thickness near the cutting edge is at most 60% as shown in FIG. 6(a) and considerably large even in the case of at most 90%, and it can be maintained when substrate 4 is partly exposed as shown in FIGS. 6(b) and (c). Furthermore, the effect of the present invention is particularly remarkable when the coating film is maximized near the cutting edge as shown in FIG. 3. In FIG. 3, inner layer 6 consists generally of at least one hard material selected from carbides, nitrides, oxides and solid solutions thereof of metals such as Ti and has substantially a uniform thickness, and outer layer 7 is a layer consisting predominantly of an oxide or oxynitride of Al or Zr which tends to be maximized in film thickness near the cutting edge. In a cutting tool having a multilayer coating of an oxide or oxynitride of Al or Zr and a hard compound of Ti in combination, therefore, it is preferable to make thinner the maximized film thickness near the cutting edge or to remove the coating layer to expose the substrate according to the present invention.

Figure 1A:
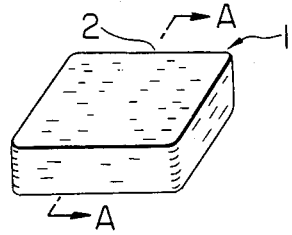
FIG. 1(a) is a perspective view of a throwaway insert of cemented carbide in general form and FIG. 1(b) is a cross-sectional view along line A—A of FIG. 1(a).
Figure 1B:
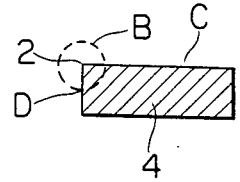
Figure 2A:
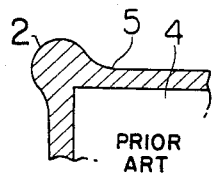
FIGS. 2(a), (b), (c) and (d) to FIG. 3 are enlarged cross-sectional views of part B in FIG. 1(b) as to various coated cemented carbide inserts of the prior art.
Figure 2B:
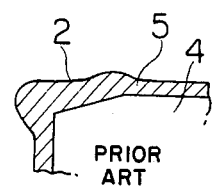

FIG. 5(a) to (c) and FIG. 6(a) to (c) are enlarged cross-sectional views of throwaway inserts near the cutting edges as embodiments of coated cemented carbide cutting tool according to the present invention. Referring to FIG. 5(a), the cutting edge of substrate 4 non-treated is coated as shown in FIG. 2(a) and coating film 5 is removed by an angle of θ in such a manner that the film thickness is gradually increased from the exposed part of substrate 4 toward both the rake face 15 and flank face 16. Referring to FIG. 5(b), the cutting edge of substrate 4 is coated as shown by R in FIG. 2(c) and then subjected to a honing treatment to make thinner coating film 5 near cutting edge 5': FIG. 5(c) is an example wherein the coating film is removed to expose substrate 4'.

Figure 2C:
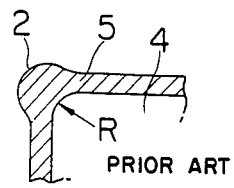
Figure 2D:
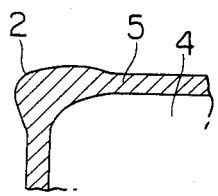

Referring to FIG. 6, the cutting edge of substrate 4 is subjected to rounded honing in such a manner that the rake face is more worked than the flank as shown in FIG. 2(d), after which hard coating film 5 is formed and then subjected to working using an elastic grindstone, thus obtaining cutting inserts of the present invention. FIG. 6(a) shows an example wherein a coating film with a thickness of t is retained near the cutting edge to satisfy the relationship of t<T for the maximum coating thickness T. (t/T)×100 is preferably at most 90, more preferably at most 60. FIG. 6(b) and (c) are examples wherein t=0 and substrate 4' is exposed, and in the case of (b), the edge is made round before coating, while in the case of (c), a sharp edge is held before coating.

In FIG. 5(a), the working is carried out by chamferhoning, but a barrel treatment after coating is preferable. Furthermore, it is most preferable in view of the lowered yield due to breakage of cutting edge and the operational efficiency to arrange a number of coated inserts on a rotary disk in such a manner that the rake faces are above and to push an elastic grindstone containing grinding grains such as of SiC, e.g. buff or brush consisting of a resin with grinding grains with revolving against the edge parts of the inserts from the rake face, thus lapping similtaneously the rake face and flank face and making thinner smoothly the film on and near the cutting edge. According to this method, the film at the side of the rake face is made thinner than at the side of the flank face, both the sides being divided by the cutting edge as a boundary, so the wear resistance can be held by the film thickness of the flank side and the toughness can be held by the thinner film on the rake side. The thus resulting cutting insert exhibits particularly excellent performances.

The following examples are given in order to illustrate the present invention is greater detail without limiting the same.

EXAMPLES

Various cemented carbide inserts having a Form No. of ISO and SNMA 120408 were coated with various hard coating films shown in Table 1. Edge treatments before coating the cemented carbide inserts were carried out as follows:

(i) No edge treatment as shown in FIG. 2(a)
(ii) Edge treatment of R=0.05 as shown in FIG. 2(c)
(iii) Edge treatment to give a substrate of a =0.03 mm and b=0.06 mm as shown in FIG. 6(a)

Edge treatments after coating were carried out as follows:

(I) No edge treatment
(II) Edge treatment by chamfering to give $\theta=20°$ and C=0.09 mm in FIG. 5(a)
(III) Edge treatment by barrel polishing to give t<T
(IV) Edge treatment by lapping with an elastic grindstone to give t<T.
(V) Edge Treatment by lapping with a brush to give t<T The above described various coated cemented carbide inserts where subjected to tests of the toughness and wear resistance and the results are shown in Table 2 with Coating Film Thickness Ratio after coating, (t/T)×100. The test conditions are as follows:

TEST CONDITIONS OF TOUGHNESS

Workpiece: round rod with four grooves of SCM 435 (Hs 36) as shown in FIG. 7
Holder: PSBNR 2525-43
Cutting Speed: 80 m/min
Cutting Depth: 2 mm
Feed: 0.12-0.28 mm/rev (same material group: under same condition)
Assessment: number of impacts till breakage (average values of eight tests)

TEST CONDITIONS OF WEAR RESISTANCE

Workpiece: round rod of SCM 415 (Hs 26)
Holder: PSBNR 2525-43
Cutting Speed: 230 m/min
Cutting Depth: 2 mm
Feed: 0.3 mm/rev
Time: 15 min
Assessment: measurement of flank wear width (mm)

TABLE 1

| No. | Coating Film (Film Thickness: value on plane part) | Substrate |
| --- | --- | --- |
| E | Titanium Carbide (8 μm) Single Layer | ISO P 30 (Cemented Carbide) |
| F | Titanium Nitride (1 μm)/Titanium Carbonitride (3 μm)/Titanium Carbide 4 μm) 3 Layers | ISO P 30 (Cemented Carbide) |

TABLE 1-continued

| No. | Coating Film (Film Thickness: value on plane part) | Substrate |
|---|---|---|
| G | Titanium Oxynitride (1 μm)/Alumina (1.5 μm)/Titanium Carbide (5.5 μm) 3 Layers | ISO M 20 (Cemented Carbide) |
| H | Titanium Nitride (3 μm) Single Layer | ISO P 10 (Nitride-containing Cermet) |
| I | Zirconia (0.5 μm)/Aluminum Oxynitride (1 μm)/Titanium Carbide (6 μm) | ISO M 20 (Cemented Carbide) |
| J | Alumina (1 μm)/Hafnium Nitride (1 μm)/Titanium Carbide (1 μm) 3 Layers | ISO M 20 (Cemented Carbide) |

TABLE 2

| No. | Material | Treatment Before Coating | Treatment After Coating | Film Thickness Ratio (t/T) × 100 | Toughness Test number of impact | Wear Resistance Test flank wear (mm) |
|---|---|---|---|---|---|---|
| 1 |   | ii | I | 105 | 62 | 0.43 |
| (2) |   | i | II | 0 | 175 | 0.34 |
| (3) |   | ii | III | 70 | 193 | 0.28 |
| (4) | E | ii | IV | 95 | 86 | 0.41 |
| (5) |   | ii | IV | 90 | 186 | 0.36 |
| (6) |   | ii | IV | 60 | 483 | 0.29 |
| (7) |   | ii | V | 40 | 539 | 0.28 |
| (8) |   | i | IV | 0 | 782 | 0.23 |
| 9 |   | ii | I | 110 | 55 | 0.41 |
| (10) |   | i | II | 0 | 180 | 0.33 |
| (11) |   | ii | III | 70 | 168 | 0.29 |
| (12) |   | ii | III | 60 | 406 | 0.27 |
| (13) | F | ii | IV | 95 | 64 | 0.40 |
| (14) |   | ii | IV | 55 | 149 | 0.24 |
| (15) |   | ii | IV | 0 | 444 | 0.23 |
| (16) |   | i | V | 0 | 724 | 0.21 |
| 17 |   | iii | I | 140 | 33 | 0.35 |
| (18) |   | i | II | 0 | 229 | 0.29 |
| (19) | G | iii | III | 50 | 233 | 0.25 |
| (20) |   | iii | IV | 50 | 402 | 0.20 |
| (21) |   | i | IV | 0 | 413 | 0.20 |
| 22 |   | ii | I | 105 | 6 | broken |
| (23) |   | i | II | 0 | 150 | 0.22 |
| (24) | H | ii | III | 0 | 175 | 0.16 |
| (25) |   | i | IV | 0 | 207 | 0.13 |
| 26 |   | ii | I | 155 | 67 | 0.46 |
| (27) | I | ii | IV | 80 | 289 | 0.38 |
| (28) |   | ii | IV | 60 | 374 | 0.30 |
| (29) |   | i | IV | 0 | 412 | 0.27 |
| 30 |   | iii | I | 145 | 91 | 0.49 |
| 31 | J | iii | IV | 100 | 138 | 0.47 |
| (32) |   | iii | IV | 0 | 351 | 0.33 |
| (33) |   | i | IV | 0 | 548 | 0.32 |

As is evident from Table 2, the inserts of the present invention indicated by Nos. in parentheses exhibit excellent toughness as well as excellent wear resistance.

What is claimed is:

1. A cutting tool having a rake face and flank face which intersect to form a cutting edge, said cutting tool comprising a substrate consisting of a sintered hard alloy containing at least one carbide of Group IVa, Va and VIa elements of the Periodic Table and a metal binder selected from the iron group metals and a coating film provided thereon, made of a material with a higher hardness than the substrate, which is at least one material selected from the group consisting of carbides, nitrides, carboxides, carbonitrides and oxides of Group IVa, Va and VIa elements of the Periodic Table and aluminum, and solid solutions thereof, said coating film near the cutting edge having such a thickness that the thickness continuously increases in directions away from the cutting edge along both the rake face and the flank face from a minimum value, including zero, at the cutting edge, such that the thickness of the coating at the rake face reaches a maximum thickness at a first distance from the cutting edge and the thickness at the flank face reaches a maximum thickness at a second distance from the cutting edge, the first distance being greater than the second distance.

2. The cutting tool of claim 1 wherein the coating film comprises at least two layers, at least one of which consists predominantly of at least one of oxides and oxynitrides of aluminum and zirconium.

3. The cutting tool of claim 1, wherein the coating film is formed by a method selected from CVD methods and PVD methods.

* * * * *